US006329987B1

(12) United States Patent
Gottfried et al.

(10) Patent No.: US 6,329,987 B1
(45) Date of Patent: Dec. 11, 2001

(54) LENTICULAR IMAGE AND METHOD

(76) Inventors: Phil Gottfried, 1207 Oakwood Trail, Southlake, TX (US) 76092; Scott Brosh, 6500 Impala Dr., Arlington, TX (US) 76017

(*) Notice: Subject to any disclaimer, the term of this patent is extended or adjusted under 35 U.S.C. 154(b) by 0 days.

(21) Appl. No.: 09/203,982

(22) Filed: Dec. 2, 1998

Related U.S. Application Data

(63) Continuation-in-part of application No. 08/762,315, filed on Dec. 9, 1996, now Pat. No. 5,924,870.

(51) Int. Cl.[7] .......... G06T 17/00
(52) U.S. Cl. .......... 345/419
(58) Field of Search .......... 345/418, 419, 345/433, 434, 435

(56) References Cited

U.S. PATENT DOCUMENTS

| | | |
|---|---|---|
| Re. 35,029 | 8/1995 | Sandor et al. . |
| 2,514,814 | 7/1950 | Towne . |
| 3,119,195 | 1/1964 | Braunhut . |
| 3,538,632 | 11/1970 | Anderson . |
| 3,937,565 | 2/1976 | Alasia . |
| 4,082,433 | 4/1978 | Appeldorn et al. . |
| 4,927,238 | 5/1990 | Green et al. . |
| 4,935,335 | 6/1990 | Fotland . |
| 5,098,302 | 3/1992 | Sekiguchi . |
| 5,113,213 | 5/1992 | Sandor et al. . |
| 5,197,886 | 3/1993 | Sekiguchi . |
| 5,206,761 | 4/1993 | Ogino . |
| 5,311,329 | 5/1994 | Haeberli et al. . |
| 5,364,274 | 11/1994 | Sekiguchi . |
| 5,438,429 | 8/1995 | Haeberli et al. . |
| 5,461,495 | 10/1995 | Steenblik et al. . |
| 5,479,270 | 12/1995 | Taylor . |
| 5,488,451 | 1/1996 | Gogginsl . |
| 5,494,445 | 2/1996 | Sekiguchi et al. . |
| 5,543,964 | 8/1996 | Taylor et al. . |
| 5,568,313 | 10/1996 | Steenblik et al. . |
| 5,695,346 | 12/1997 | Sekiguchi et al. . |

*Primary Examiner*—Cliff N. Vo
(74) *Attorney, Agent, or Firm*—Strasburger & Price, LLP

(57) ABSTRACT

The creation of computer generated lenticular images involves the computer manipulation of at least a first and second source image. The images can be of the same object and can be sequential in time or sequential in spatial perspective, or completely unrelated. The images can be scanned into a computer memory and are interlaced. The input can be any source of image. Likewise, the output can be manipulated to any resolution. The output interlaced image is then printed onto a substrate, such as the back surface of a lenticular lens. The frequency of the interlaced image can be matched to the geometry of the lenticules. Thus, the viewer will see the first image from a first viewing perspective and the second image from a second viewing perspective. The invention also provides quality control methods useful in the manufacture of lenticular lenses and lenticular devices.

41 Claims, 8 Drawing Sheets

LENTICULAR IMAGE AND METHOD

CROSS-REFERENCE TO EARLIER FILED APPLICATIONS

The present application is a continuation in part of U.S. patent application Ser. No. 08/762,315 filed Dec. 9, 1996 now U.S. Pat. No. 5,924,870.

TECHNICAL FIELD OF THE INVENTION

The present invention relates to a method of creating a three-dimensional or action lenticular image using a computer to manipulate, interlace and dither the underlying images. The method involves the interlacing of source images to form an interlaced image for subsequent viewing under a lenticular lens as well as the dithering of the interlaced image to increase the overall image resolution. The process of the invention permits a computer generated interlaced image to be used with any lenticular lens and output device, such as a plotter or printer. The interlaced image can be printed directly onto the rear surface of a lenticular lens.

BACKGROUND OF THE INVENTION

Three-dimensional holograms are eye-catching. They are useful in advertising almost any goods. For example, holograms can be incorporated into sports trading cards, inserts for CDs, on the face of tickets to verify authenticity or even on mouse pads used with computer pointing devices. However, holograms typically involve difficult photographic techniques that increase the price for the images. Thus, it is not presently economical to use holograms on many items. A need exists for a less expensive method of generating an image similar to a hologram. Such a method should create both three dimensional imagery or action sequences that move according to the viewing angle.

One method of creating an image is disclosed in U.S. Pat. No. 5,364,274 to Sekiguchi entitled "Process For Producing A Display With Movable Images." The Sekiguchi process involves generating at least two images with a computer. The first can be produced either by creating an original illustration or by scanning a desired image. The second image can be generated by electronically copying and subsequently altering and modifying the first image on the monitor. At least one and preferably all the images are then masked, electronically removing, erasing, canceling, or otherwise deleting a symmetrical pattern of spaces on the images to form masked images with a spaced array of stripes comprising viewable opaque portions with spaces positioned between and separating the stripes. After masking, part of the masked image is overlayed, superimposed and combined upon each other in offset relationship so that the viewable strips of one image are positioned in the spaces of another image. The superimposed images are printed on an underlying web. A grid or sleeve can be placed in front of the superimposed images of the rearward web. Thus, the grid will reveal one image when positioned over the printed portions of the other constituents of the combined pattern. Movement of the grid will then reveal another image. The Sekiguchi method does not disclose dithering of the superimposed images prior to printing the image on an output devices.

Another method of creating a lenticular image is disclosed in U.S. Pat. No. 5,494,445 to Sekiguchi et al. entitled, "Process and Display with Movable Images." This patent is a continuation-in-part of the Sekiguchi '274 patent. Another method of creating a lenticular image is disclosed in U.S. Pat. No. 5,695,346 to Sekiguchi et al. entitled, "Process and Display with Movable Images." This patent is a continuation-in-part of the Sekiguchi et al. '445 patent. Neither of the Sekiguchi et al. patents disclose a method of producing a lenticular image wherein the interlaced image is dithered one or more times, neither do they disclose the sizing of the dithered interlaced image in order to match the frequency of the combined image strips to the frequency of the lenticules on a lenticular lens.

Another method of producing an image is disclosed in U.S. Reissue Pat. No. 35,029 to Sandor et al. entitled "Computer Generated Autostereography Method and Apparatus." The Sandor method produces an autostereographic image by inputting to a computer a predetermined number of planar images of an object. Each of the planar images is a view of an object from a different viewpoint. The computer then interleaves the images and then prints these onto a film. A spacer with a thickness is placed over the film. Finally a barrier strip having slits is placed over that spacer. The system requires the use of an off-axis projection to produce the three-dimensional image. If the image is to be viewed from a position (x,y,z) in front of the autostereograph, then a position (x',y',z') is determined on the film that will make that projection. The Sandor et al. '029 Patent does not disclose dithering of the interlaced image.

U.S. Pat. Nos. 5,311,329 and 5,438,429 both to Haeberli et al. disclose a method for the digital filtering of lenticular images wherein the method is similar to that of the Sandor et al. U.S. Pat. No. 5,113,213, but further includes a step of unsharp masking which is a technique employed to increase the sharpness of edges in a lenticular image. The unsharp masking technique requires a measurement of intensities of pixels in an interlaced image and in an unfocused or blurred version of the same interlaced image. Once the waveform intensities have been determined, the intensity of each pixel is adjusted either up or down according to a calculated blending factor. Neither of the Haeberli et al. patents disclose dithering of the interlaced image either once or twice after the interlaced image has been formed, nor do they disclose the sizing of the dithered interlaced image such that the frequency of combined image strips in the interlaced image will substantially match the lenticular frequency of a lenticular lens and the resolution of the sized interlaced image will substantially match or exceed the resolution of an output device used to output the interlaced image.

Substrates bearing interlaced images in combination with lenticular lenses overlaying the interlaced images are also disclosed in U.S. Pat. No. 5,488,451 to Goggins, U.S. Pat. No. 5,568,313 to Steenblik et al., U.S. Pat. No. 5,543,964 to Taylor et al., U.S. Pat. No. 5,461,495 to Steenblik et al., U.S. Pat. No. 4,935,335 to Fotland, U.S. Pat. No. 4,082,433 to Appledorn et al., U.S. Pat. No. 3,937,565 to Alasia, U.S. Pat. No. 3,538,632 to Anderson, and U.S. Pat. No. 3,119,195 to Braunhut.

Known processes for preparing lenticular items generally require prefabrication of the lenticular lens and printing of an interlaced image on a substrate. During manufacture, the lenticular frequency of the lenticular lens can differ from specifications as the lens is being produced or can vary from batch to batch. If the lenticular lens has a frequency that varies across the lens, it is incorrectly manufactured. Consistency and uniformity are essential to the function of quality lenticular lenses. The variation in lenticular frequency makes matching of it with the interlaced image strip frequency and resolution difficult. Therefore a need exists for a method of preparing lenticular items where the frequency of the interlaced image can be made to substantially match to the lenticular frequency of the lenticular lens as desired.

In the known art, source images are interlaced with at least one pixel per image stripe at a pixel resolution that approximates the product of the lenticular frequency times the number of source images. This initial interlaced or masked image has a one to one relationship of pixel to image stripe. The prior art also discloses use of a barrier image instead of a lenticular lens which allows the prior art to define the barrier/mask using a one to one pixel relationship between the interlaced image stripes, the barrier stripes and the printer resolution. With a lenticular lens this is not always possible since most printers have fixed resolutions. If the initial interlaced image is printed on a device that does not support the pixel resolution of the interlaced image the output device will compensate for the difference using various dithering and interpolation methods. Usually this will result in an undesirable banding effect as the printer tries to compensate for the resolution difference.

A further need exists for a method which produces high-quality, inexpensive, and easily constructed images similar to holograms. The method should allow for the use of any quality of input. Further, it should allow for the production of the output image with any quality of output device. The method should eliminate unnecessary elements, thereby reducing the cost of the finished image.

SUMMARY OF THE INVENTION

The present invention relates to a method of creating a lenticular image with computers, digital imaging devices and lenticular lens materials. The method can be used to produce three dimensional images as well as action images. Three-dimensional images are those images which include image portions that appear to project out of or extend into the plane of the lenticular image. Action images are those images which depict a sequence of events such as can be formed by viewing a number of sequential frames in a movie film strip.

The process of the invention and products manufactured thereby include interlaced images disposed on a substrate behind a lenticular lens or on the rear surface of a lenticular lens. The images are interlaced as described in more detail below.

The present method produces articles which comprise an interlaced image having a resolution which can be matched to the geometry of a respective overlying lenticular lens. The interlaced images can then be printed onto a substrate such as the back surface of a lenticular lens. The present method further includes the improvement of dithering the interlaced image prior to printing the image on an output device.

Accordingly a first aspect of the invention provides a method of producing a lenticular image comprising the steps of:

- interlacing at least first and second source images with a computer to form an interlaced image;
- dithering said interlaced image with said computer to form a dithered interlaced image; and
- printing said dithered interlaced image on a bottom surface of a lenticular lens.

The method of the invention can comprise one or more of the following additional steps:

- dithering either one or more of said at least first and second source images prior to interlacing said images;
- increasing the resolution of said interlaced image prior to printing said interlaced image;
- matching the resolution of said interlaced image to the resolution of an output device on which said interlaced image will be printed prior to printing said interlaced image; and
- matching the combined image strip frequency of said interlaced image to the geometry of a lens to be used to view said interlaced image.

One or more of the above steps can be performed on a computer

Another aspect of the invention provides a lenticular image comprising:

- a lenticular lens; and
- a dithered interlaced image printed on a surface of said lenticular lens, said interlaced image comprising at least first and second source images;
- wherein, said interlaced image has been dithered on a computer after said at least first and second source images have been interlaced.

The lenticular image of the invention can further comprise one or more of the following features:

- at least a first and/or second dithered source image;
- a dithered interlaced image having a combined image strip frequency matching the lenticular frequency of a lenticular lens which will be used to view said interlaced image.

Another aspect of the invention provides a method of preparing a lenticular image comprising the steps of:

- obtaining at least first and second source images in an electronic format;
- interlacing said at least first and second images on a computer to form an interlaced image having a first resolution and a first frequency of combined image strips;
- matching said first resolution of said interlaced image to a resolution of an output device by dithering said interlaced image on said computer;
- adjusting the size of said interlaced image to form a sized interlaced image having a first frequency of combined image strips that matches a second frequency of lenticules in a lenticular lens;
- outputting said sized interlaced image to form an output interlaced image; and
- viewing said output interlaced image through said lenticular lens.

Yet another aspect of the invention provides a method for rapidly determining the quality of a lenticular lens, the method comprising the steps of:

- obtaining a lenticular lens comprising a plurality of lenticules having a lenticular frequency and a first geometry, said lens being required to meet a first set of specifications;
- obtaining one or more interlaced images having a known combined-image strip frequency, each interlaced image comprising at least a first source image and a second source image; and
- viewing said one or more interlaced images through said lenticular lens to determine whether a desired lenticular image is formed, wherein a lenticular lens is of acceptable quality when a desired lenticular image is formed.

The method for rapidly determining the quality of a lenticular lens according to the invention generally relies upon the formation of a lenticular image of acceptable quality which image is formed when the lenticular frequency of a lenticular lens substantially matches the combined image strip frequency of an underlying interlaced image. When viewed from a first angle, the desired lenticular image will preferably consist of a first source image, and when viewed from a second angle, the desired lenticular image will consist preferably of a second source image.

This quality control method of the invention can also be used to determine the lenticular frequency of a lenticular lens.

One or more of the methods of the present invention can be conducted during or after the manufacture of a lenticular lens. One or more of the present methods can also be conducted by at least one of an operator and an instrument, apparatus, or machine.

BRIEF DESCRIPTION OF THE DRAWINGS

For a more complete understanding of the present invention, and for further details and advantages thereof, reference is now made to the following Detailed Description taken in conjunction with the accompanying drawings, in which.

DETAILED DESCRIPTION OF THE INVENTION

Figure 1:
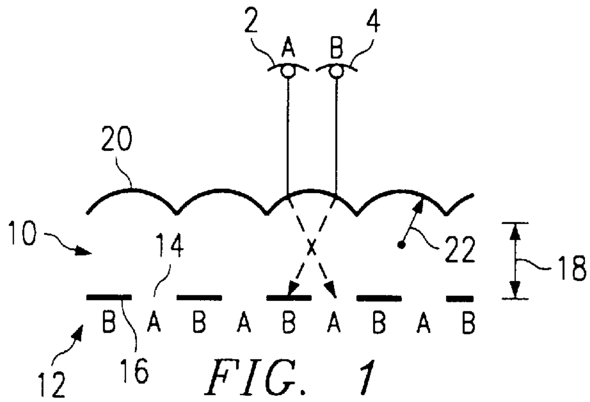
FIG. 1 is an illustration of a sectional view across the lenticular image showing a background image of interlaced A and B images covered by a lenticular lens.
Figure 2:
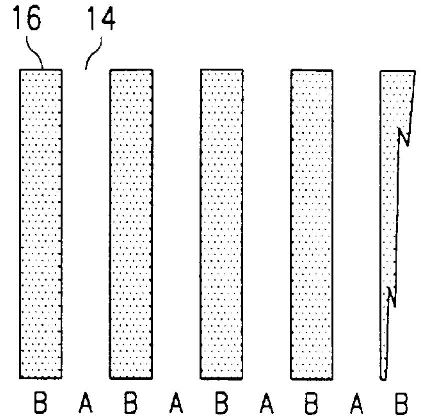
FIG. 2 is a top view of the A and B images interlaced.

The present method of creating a lenticular image overcomes many of the disadvantages found in the prior art. The present method can be used to create three-dimensional images, moving or sequential action images or combinations thereof. The method produces remarkable depth and clarity of image, yet the method is economical in comparison with earlier methods.

FIGS. 1, 2, 3*a* and 3*b* illustrate the basic, i.e., the simplest, form of the method of the invention which is a method of creating a lenticular image (10) from first (14) and second (16) source images. The method involves the creation of an interlaced image (12) from the first (14) and second (16) source images. Image (14), also designated A, in this example is simply a white field, and second image (16), also designated B, is simply a black field. Both images are stored in a memory within a computer. The computer then slices or cuts the images A and B into strips and places the strips in alternate order forming an interlaced image comprising alternating strips of images A and B. Each pair of source image strips A and B is called a combined image strip. The interlaced image, which comprises the combined image strips present in a known frequency, is then printed onto a surface such that the frequency of combined image strips of the interlaced image is about the same as or equal to the frequency of lenticules of a lenticular lens which is to be used to view the interlaced image. The lenticular lens is then placed over the surface comprising the interlaced image. From one viewing angle (2), only a white field A is observed (20). From a second viewing angle (4), only a black field B is seen by the viewer.

The interlaced image can of course be significantly more complex than the simple black and white fields exemplified above. For example, the appearance of action could be achieved using this method. If a first source image depicts a batter preparing to swing his bat, then the second image could be the batter in mid swing. These source images can be interlaced, and the interlaced image placed under a lenticular lens. The viewer, depending on his viewing angle, could see the batter in the first source image, and then by moving his head, or by moving the interlaced image with respect to the lenticular lens, or by tilting the combined lenticular lens and interlaced image with respect to his viewing angle, he could see the second source image of the batter in mid swing.

The transition between the first and second source images in an interlaced image can be improved by adding additional source images. For example, an action sequence can be produced by interlacing three or more sequential source images of a batter in motion. In other words, this method is not limited to a single source image. Instead two or more sequential source images can be interlaced to create an action interlaced image. Thus, the present method is useful for preparing lenticular images comprising an interlaced image made from individual sequential source images.

Three dimensional lenticular images are produced in much the same way. However, instead of having underlying source images that are sequential in time, the three dimensional lenticular image will have underlying source images that are sequential in space. In other words, a three dimensional lenticular image comprises three different source images which source images are images of a same object but from three different perspectives. The three source images are then interlaced with the assistance of a computer while keeping a common aim point. The interlaced image is then printed onto a substrate or directly onto the rear or bottom surface of the lenticular lens. This method produces a result where the background and foreground portions of the underlying object appear to move in relation to the central portion of the object as the lenticular image is viewed from different angles thus giving the perception of a three dimensional lenticular image.

Figure 15:
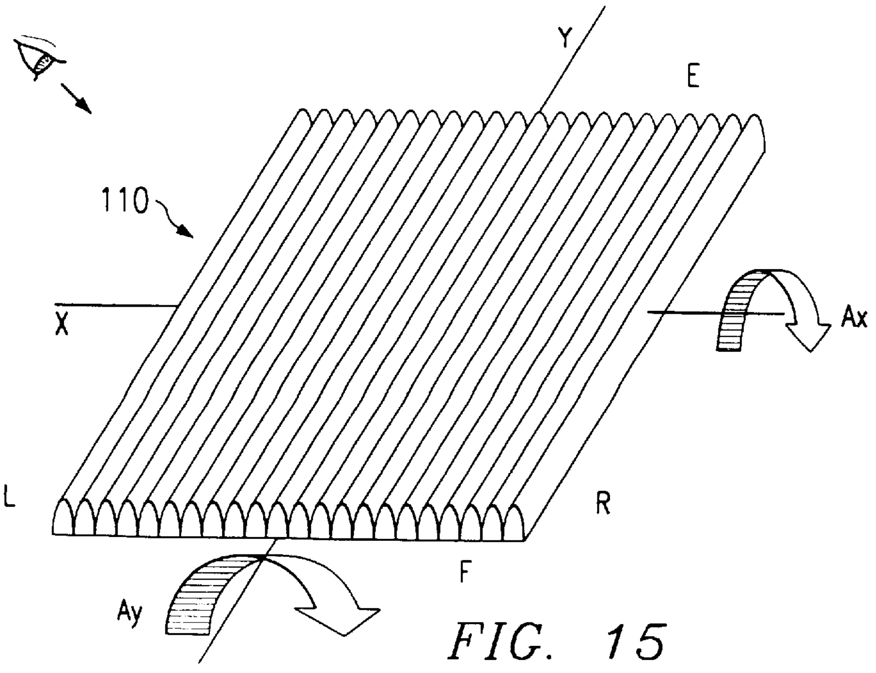
FIG. 15 is a perspective view of a lenticular lens depicting its axes of rotation for viewing.

The expected disposition of the lenticules of a lenticular lens relative to the alignment of the eyes of a viewer should be considered when preparing three dimensional and/or action lenticular images. FIG. 15 depicts a perspective view of a lenticular lens (110) lying along a plane defined by the axes (X) and (Y). When a viewer's eyes are aligned with the axis (Y) and the lenticular lens (110) is rotated about the axis (Y), the viewer will be able to see a two dimensional action lenticular image. However, when a viewer's eyes are aligned with the axis (X) and the lenticular lens (110) is rotated about the axis (y), the viewer will be able to see a three dimensional still, i.e., not action, lenticular image, a three dimensional action lenticular image, or a two dimensional action lenticular image. When a viewer's eyes are aligned with the axis (X) and the lenticular lens (110) is rotated about the axis (X), the viewer will be able to see a three-dimensional still lenticular image. Thus, the present invention provides a method of making lenticular images including two or three dimensional still or action lenticular images. The type, i.e., sequential in time and/or space, of source images used and the method by which the images are interlaced will dictate the type of lenticular image ultimately formed.

During the interlacing process, a certain amount of data or a certain portion of each source image comprising the interlaced image is lost. However, the final interlaced image is generally approximately the same size as the two original images. For example, if each of image A and image B is 10 cm×10 cm, then the interlaced image will be about 10 cm×10 cm. The amount of information lost during the interlacing process affects the final resolution of the lenticular image. In one embodiment, the measured dimensions of the source images are not the same as the final interlaced image. An image that is 640×480 pixels at 72 dpi, as is the case with digital video stored on disk, gives an image size of 8.8"×6.6" with an aspect ratio of 1.333:1. The first step of the process then converts the image from 72 dpi to 750 dpi (i.e. 10 frames on a 751 pi lens) in memory. At the same time the size of the image can be changed to 3.33"×2.5" or some other dimensions while maintaining the original aspect ratio. The 750 dpi source images are then interlaced.

A spacer between the interlaced image and the lenticular lens is unnecessary in the present method. However, the geometry, i.e., the lenticule frequency and shape, and other aspects of the lenticular lens effect the performance of a lenticular lens with a particular lenticular image. The lenticule pitch, lenticule radius of curvature, lens thickness and index of refraction of the material used to construct the lenticular lens affect the performance of the lenticular lens and the features of a lenticular image formed by that lens.

Figure 3A:
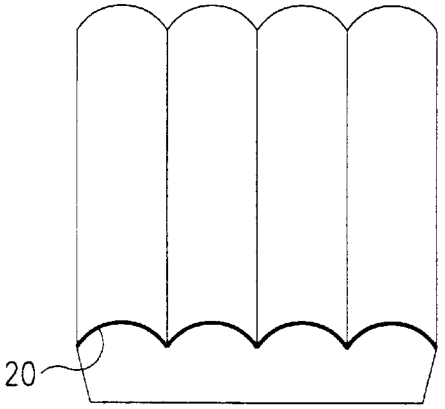
FIG. 3*a* is a view through the lenticular lens at an angle that only reveals image A.
Figure 3B:
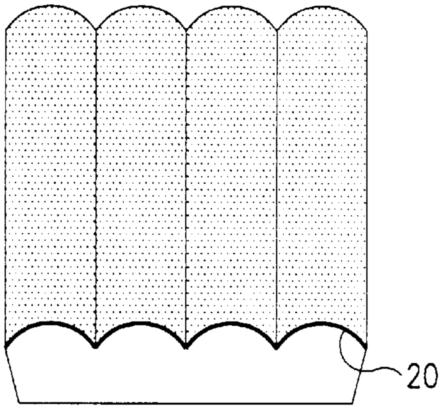
FIG. 3*b* is a view through the lenticular lens at an angle that only reveals image B.
Figure 3C:
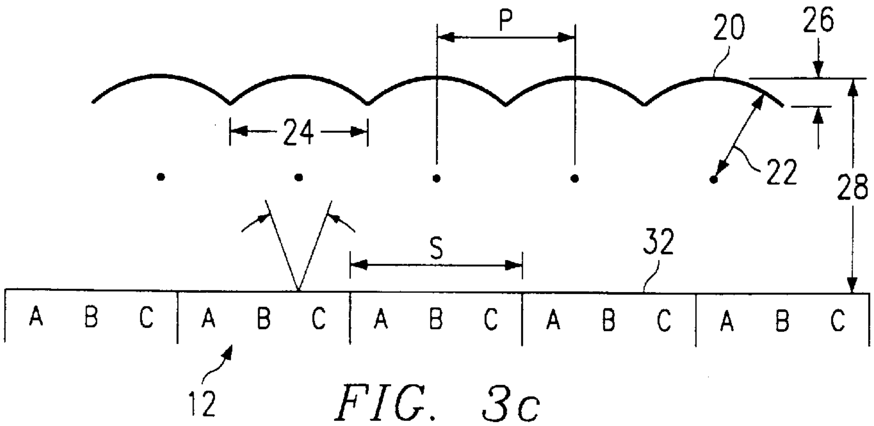
FIG. 3*c* is a cross-section of a lenticule in a lenticular lens.

Referring now to FIG. 3*c*, the lens has a plurality of parallel, uniformly shaped, closely spaced, hemi-cylindrical lens units or lenticules (20). Each lenticule has both a radius of curvature (22) and a defined pitch (24, P). The pitch of a lenticule refers to the inverse of the frequency of the lenticules in the lenticular lens, where the frequency is the number of lenticules per inch of lenticular lens measured along the transverse axis (X, see FIG. 15). In other words, if the pitch of a lenticule is 0.012 inch, then the frequency of the lenticules in the lenticular lens is 83.33, or 1/0.012, lenticules per inch. Referring again to FIG. 3*c*, each lenticular lens also has a lenticule thickness (26) and an overall lens thickness (28). The overall lens thickness will generally exceed twice the radius of curvature of each lenticule. For example, if the radius of curvature of the lenticules of a lens is 0.008 inches then the overall lens thickness will exceed 0.016 inches.

The index of refraction of the material used to construct the lens will help determine the overall lens thickness. Generally, the higher the index of refraction of the material used, the thinner the overall lens thickness. For example, poly(vinyl chloride) (PVC) has an index of refraction that is lower than that of poly(ethylene terephthalate glycolate) (PETG); consequently, a lens made from PVC will generally be a focal length or thickness that is greater than a lens made from PETG in order to obtain approximately the same quality of a lenticular image and the same focal property.

Figure 13:
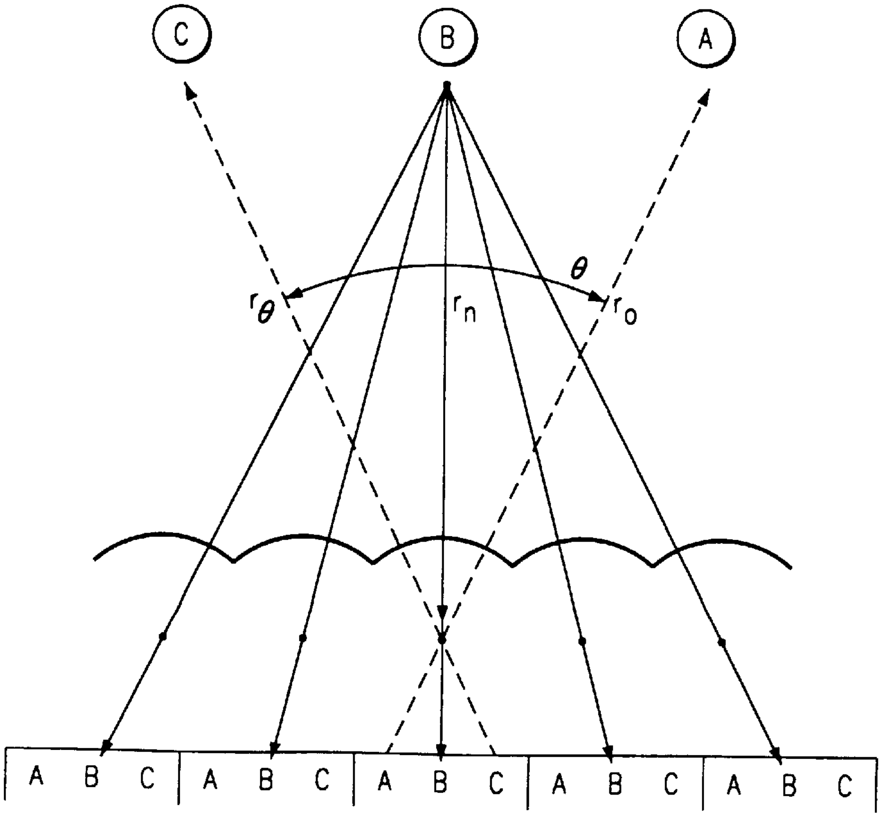
FIG. 13 is a side elevation view of a combined lenticular lens and interlaced image-bearing substrate, and this figure illustrates the concept of the lobe or viewing angle with respect to the lenticules of the lenticular lens.

The above-mentioned factors which help determine the overall lens thickness also help determine the lobe angle (Ø) and overall viewing angle (Ω)of a lenticular image in a lenticular device according to the invention. As depicted in FIG. 13, the lobe angle (Ø) is the range of viewing angles ($r_0$–$r_Ø$) within which each image strip ($A_1$–$A_5$, $B_1$–$B_5$, $C_1$–$C_5$) of each source image (A, B, C, respectively) in a combined image strip (I–V, respectively) is viewed only once. That is, each image (A, B, C) will be viewed only once within the viewing range of the lobe angle. Thus, at the viewing angle ($r_0$), all the image strips ($A_1$–$A_5$) for the source image (A) are seen by the viewer. At the viewing angle ($r_n$) all the image strips ($B_1$–$B_5$) for the source image (B) are seen by the viewer. At the viewing angle ($r_Ø$), all the image strips ($C_1$–$C_5$) for the source image (C) are seen by the viewer. The lobe angle (Ø) depicted in FIG. 13 is approximately 30 degrees; however, the lobe angle can be made wider or narrower as desired. If a viewer views the lenticular image beyond the range of the lobe angle, he will begin to see a repeat of portions of the lenticular image already viewed within the lobe angle. It will be understood that each image (A–C) will have its own preferred viewing angle. It will also be understood that, although the lobe angle is a fixed range, the lobe angle is not fixed at a particular angle of incidence with respect to the lenticular lens.

Figure 14:
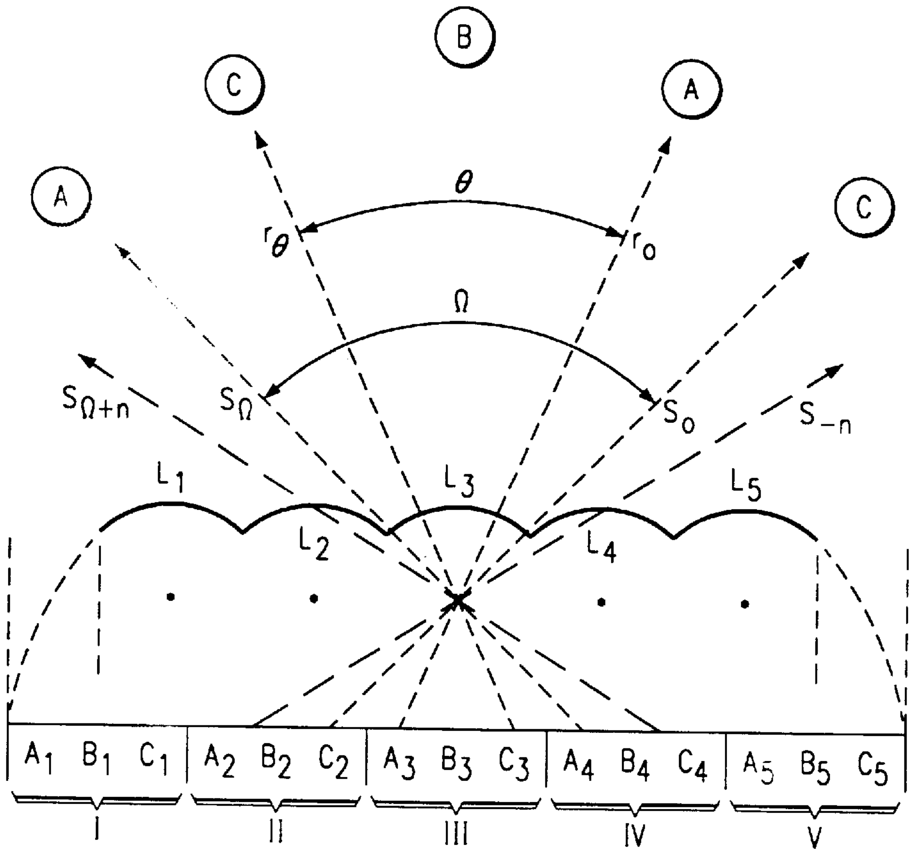
FIG. 14 is a side elevation view of a combined lenticular lens and interlaced image-bearing substrate, and this figure illustrates the difference between the lobe angle of a lenticule and the maximum viewing angle or a lenticule.

The maximum viewing angle (Ω) is the range of angles ($S_0$–$S_Ω$) within which the combined image strips (I–V) can be viewed through individual first lenticules without interference from adjacent second lenticules. For example, FIG. 14 depicts the first limit angle ($S_0$) of the maximum viewing angle ($S_Ω$). When the lenticular image is viewed at an angle ($S_{-n}$) which is beyond the first limit angle ($S_0$), the lenticule ($L_4$) interferes with viewing through the lenticule ($L_3$). In a similar fashion, when the lenticular image is viewed at an angle ($S_{Ω+n}$) which is beyond the second limit angle ($S_Ω$), the lenticule ($L_2$) interferes with viewing through the lenticule ($L_3$).

It will be understood that the lobe angle can be narrower than or can approximate the maximum viewing angle; however, it is generally preferred that the lobe angle be narrower than the maximum viewing angle.

According to an exemplary embodiment of the invention, a lenticular lens having a radius of curvature (22) of 0.009 inches, a lenticule pitch (24) of 0.015 inches, a lenticule thickness of 0.0040205 inches and an overall thickness of 0.0225 inches is prepared. This lens has a lobe angle (30) of about 58 degrees.

A lenticular device made according to the method of the invention includes an interlaced image (12) having a resolution which is directly related to the geometry of the lenticular lens. The relationship between image resolution and lenticular geometry can be illustrated with the following example. If an interlaced image comprising twelve underlying, or source, images is desired and a lenticular lens having 83 lenticules per inch will be used to view the interlaced image, then an interlaced image having a resolution of approximately at least 996 dots per inch (12 images times 83 lenticules per inch) should be used. This relationship holds true because each combined image strip of the interlaced image will comprise 12 individual image strips, and, where the width of each individual image strip corresponds to one dot, or pixel, on an output device, the resulting resolution requirement for the interlaced image is approximately at least 996 dots per inch (dpi). In a preferred embodiment, the width of each individual image strip exceeds the width of a single dot or pixel. Accordingly, the resolution of a dithered interlaced image and that of an output device intended to output the image will generally be greater than the frequency of individual image strips comprising an interlaced image.

Referring again to FIG. 3*c*, the frequency of the combined image strips of the interlaced image (12) and the lenticular frequency of an overlying lenticular lens are also related by the following equation: $S \geqq P$, where S is defined as the pitch of the combined image strips, and P is defined as the pitch of the lenticules (20) of the lenticular lens. As discussed above, the pitch of the interlaced image equals the inverse of the frequency of the combined image strips in the interlaced image, i.e., the inverse of the number of combined image strips per inch of interlaced image. For example, when an interlaced image comprises ten different underlying or source images and a lens having a lenticule frequency of 60 lpi, p=0.0166 will be used to view the interlaced image, the required frequency of the interlaced image will be less than or equal to 60 combined image strips per inch which corresponds to a pitch of at least 0.0166 for the combined image strips. If the pitch of the combined image strips is substantially less than the pitch of the lenticules, then the lenticular image will appear banded due to incorrect alignment with the lenticules. Accordingly, the process of the invention can be used to prepare lenticular images where the pitch of the combined image strips of an interlaced image is greater than or equal to the pitch of the lenticules of a lenticular lens used to view the lenticular image. Generally as the pitch of the lenticular image increases with respect to the pitch of the lenticular lens, the optimal viewing distance decreases. When the pitch of the lenticular image and the pitch of the lens are equal, the optimal viewing distance is effectively infinite.

The final resolution of the interlaced image will be related to the geometry of the lens used to view the interlaced image, the pitch of the combined image strips that comprise the interlaced image and the number of source images that are being interlaced to form the interlaced image. Each combined image strip will generally comprise one individual source image strip from each source image. If a lenticular lens having a lenticular frequency of 72 lpi will be used to view an interlaced image comprising 10 different source images, the interlaced image should have a combined image strip frequency of about 72 combined image strips per inch and a resolution of at least about 720 dots per inch, where the width of each individual image strip, in a combined image strip, approximates the width of one dot, or pixel, of an output device. Where the width of each individual image strip, in a combined image strip, exceeds the width of one dot, or pixel, of an output device, the resolution of the final interlaced image and the output device will exceed the frequency of individual image strips in the interlaced image. In order for this to occur, the initial interlaced image will have to be dithered at least once and preferably twice prior to formation of the final lenticular image. As described in further detail below, the dithered interlaced image can be resized so that the frequency of combined image strips is equal to or preferably less than the frequency of the lenticular lens.

Once the interlaced image has been generated and dithered at least once, it can be printed directly onto the back surface (32) of the lenticular lens. Alternatively, the image can be printed onto a substrate and a lenticular lens attached to it with an adhesive or other fixing means.

According to a preferred embodiment of the invention, the resolution of an initial interlaced image will be less than or at least about equal, preferably equal, to the resolution of an output device to be used in printing the interlaced image. For example, if the output device can only print at a resolution of 1000 dpi and the interlaced image to be printed has a resolution of 600 dpi the interlaced image must be "dithered" to achieve the desired resolution. Dithering is a procedure well known to those of skill in the art of printing, and it is generally considered to be a interpolation process which, in a graphic, numeric or binary file, creates one or more new data values which lie between the stored data values of the file. If a single new data value is created between two stored data values, the new data value will generally be an average of the two stored data values. For example, if a color graphic file is dithered and a first stored data value corresponds to a red colored pixel and a second stored data value corresponds to a blue pixel, then the new data value created by dithering will correspond to a purple pixel. Since the process of dithering can be used to create plural new data values between two stored data values, the resolution of an interlaced image can be increased as desired by dithering to form a dithered interlaced image which resolution can be made to match or exceed the resolution of an output device. Accordingly, the method of the present invention can include the step of dithering an interlaced image prior to printing to make the resolution of the dithered interlaced image greater than or equal to the resolution of an output device.

It is preferred that the dithering and resizing operations occur on a computer rather than on an output device intended to output the image since the interpolation and/or dithering process that is performed by known output devices is generally unacceptable. The interpolation process of these output devices has a tendency to introduce banding into the final lenticular image due to the output device's method of compensating for the differences in resolution between the initial interlaced image and the output device's resolution.

While there are numerous ways to dither/interpolate image data, a preferable method known as the bicubic interpolation process is used. The bicubic interpolation uses the values of pixels in columns and rows adjacent to a source pixel to calculate the pixels of the interpolated image. The process can also take into account the value of pixels several pixels from the source pixel as well as pixels already calculated for the output image. In the preferred dithering process, zero, one or more newly calculated pixels are inserted between adjacent pixels in the interlaced image.

According to another preferred embodiment, the present method can manipulate input images of any resolution and produce an interlaced image suitable for any device regardless of its resolution. Further, the method allows for the sizing, magnification or reduction, of the interlaced images. Matching the resolution of an interlaced image to that of any output device and lenticular lens generally involves several steps. By way of example, assume that an interlaced image will comprise twelve source images, each source image having a resolution of 640 pixels wide by 480 pixels high. Assume further that the interlaced image will be viewed with a lenticular lens having 66.66 lenticules per inch. Also assume that each image is 8.8 inches wide and 6.6 inches high. According to the present process, each image is converted to a resolution of 792 pixels or dots per inch, i.e. 66 times 12, resulting in an interlaced image that is 8.8 inches wide by 6.6 inches high at 792 dots per inch resolution. The interlaced image resolution is then changed to match the resolution of the output device. This resolution change can be either an increase or decrease in resolution, with respect to dots per inch; however, an increase is preferred. It is preferred that the width and height of the interlaced image not change during this change in resolution. Now assume that the intended output device has a resolution of 1000 dots per inch. In that case, an additional 208 dots per inch must be added to the interlaced image to match the 1000 dpi resolution of the output device. This increase in resolution is achieved according to the dithering process described above. Once the interlaced image is dithered, it is sized such that the combined image strip frequency of the interlaced image is equal to or preferably less than the lenticule frequency of the desired lenticular lens. The ability to size the dithered interlaced image to match the exact lenticule frequency of a lenticular lens is particularly important for quality control during the manufacture of lenticular devices, since lenticule frequency in lenticular lenses is known to vary significantly from the frequency rating detailed in the manufacturers product specifications of the lens. The ability to size the dithered interlaced image is important toward providing a process which can generate an interlaced image which can be output to almost any output device.

According to the present process, the resolution of the dithered interlaced image can exceed the resolution of an output device which will be used to output the interlaced image, i.e., the width of a combined image strip can comprise a number of pixels which is greater than the number of individual image strips used to form the combined image strip. Therefore, each individual image strip can be one or more pixels wide. The dithered interlaced image at this point will generally have a frequency that approximates the lenticular frequency of a lenticular lens which will be used to view the lenticular image. The size of the dithered interlaced image is then enlarged or reduced using a second dithering or interpolation process such that the frequency of combined image strips in the interlaced image will be slightly smaller than the frequency of lenticules of a lenticular lens. This second dithering process permits a single interlaced image to operate properly with lenticular lens and output device resolution combinations that the prior art does not permit. After the second dithering or sizing, the interlaced image will generally have a one to one relationship of dithered interlaced image pixel to output device resolution. The second sizing process can either add additional or delete unnecessary pixels in a dithered interlaced image.

Figure 12:
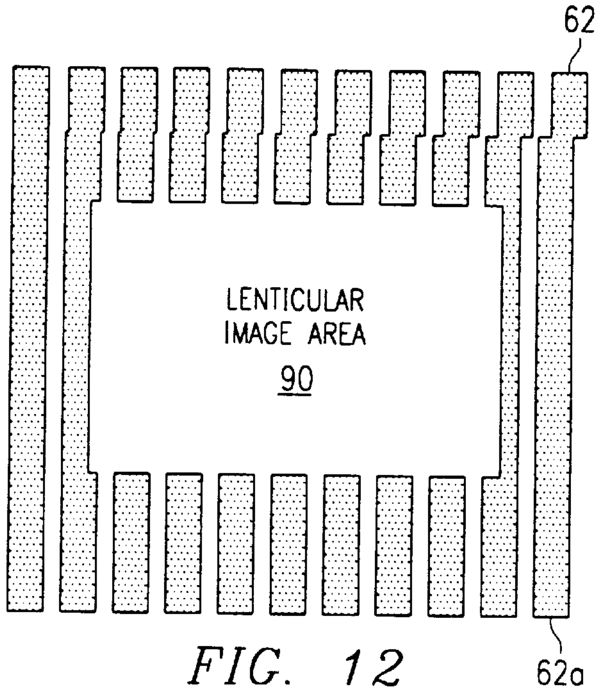
FIG. 12 is a top plan view of a dithered interlaced image bounded by a first sized strip and a first unsized strip.

In order to accurately match the resolution of an interlaced image to a particular lenticular lens, an interlaced image can be prepared having mask information on a border thereof. As depicted in FIG. 12, the interlaced image (90) is partially bounded with an unaltered first mask (62) and a sized second mask **(62*a*). The linear axes of the individual line segments of the masks is parallel to the linear axes of the interlaced image strips and the lenticules of a desired lenticular lens. During the process of sizing the interlaced image as described above, the interlaced image may need to be altered in width to match the actual lenticule frequency of the lenticular lens. The second mask (62*a*) is sized to match the combined image strip frequency of the interlaced image (90). If the lens is accurately formed, then the second mask (62*a*) should be either all black or all white, depending upon the viewing angle, and a correct lenticular image should be formed when the mask (62*a*) and the interlaced image are viewed through a matching lenticular lens. If the lens is not properly aligned with the mask (62*a*), a diagonal striping will be viewable through the lens along the side and bottom boundaries. The unsized first mask (62) will produce a repetitive interference pattern when viewed through a lens, since the cumulative error will produce a predictable vertical stripe pattern along the upper boundary of the lenticular lens. For example, a particular five percent difference between the sized (62*a*) and unsized (62)** masks might generate four distinct black bands on the upper boundary when viewed through a lens. This simple visual quality control method allows even an unskilled laborer to rapidly check a lens to determine if it is a correct match for the interlaced image which it is intended to superpose.

The upper mask (62) can also reveal additional quality control information about the lenticular image. Generally, the color black, in a lenticular image, is formed by the combination of several primary color inks even when using a CMYK output device. If these inks have not been laid down correctly, the lenticules above the upper mask (62) might reveal a blue or yellow, or any other color, ghost image of the lenticular image, since the lenticular lens magnifies even a minor misalignment between the lenticules and the interlaced image.

If it is determined that the frequency of the lenticular lens does not match the frequency of the interlaced image, the interlaced image can be sized up or down to match the actual frequency of the lens. This quality control method allows for easy detection of lens misaligmnent, deviations from expected lens geometry, and printing errors present in the interlaced image.

The source images and interlaced images according to the invention can be stored in any suitable electronic format such as the RAM, ROM, CD-ROM., DVD, ERAM, digital, analog and other formats known to those of ordinary skill in art of information storage in electronic formats.

The lens can be made of any translucent or transparent material such as PETG, polystyrene, polyethylene, polyacrylates, polymethacrylates, poly(ethylene terephthalates), polypropylene, polybutylene, polycarbonate, PVC (poly(vinyl chloride)), plastic, film, rubber, glass, and combinations thereof.

The interlaced image can be printed on a substrate or directly on the rear surface of the lenticular lens. The printing on the substrate is preferably done with a Heidelburg printing press. If the interlaced image is a color image, it can also be printed by color separations. The print order is typically black, cyan, magenta and yellow when printing to the back surface of the lens and is reversed when printing on a substrate that the lens is applied to. For example, a cyan print can be laid down onto the rear surface of the lenticular lens. The ink can then be cured with ultraviolet light prior to the printing of the next color separation, typically magenta. After the primary color separations are printed, a white backing layer can be applied over the entire interlaced image. The printing of the interlaced images can be done on any suitable output device, including laser printers and even ink jet printers. The term printing includes any method of producing an image including photographic techniques.

Figure 4:
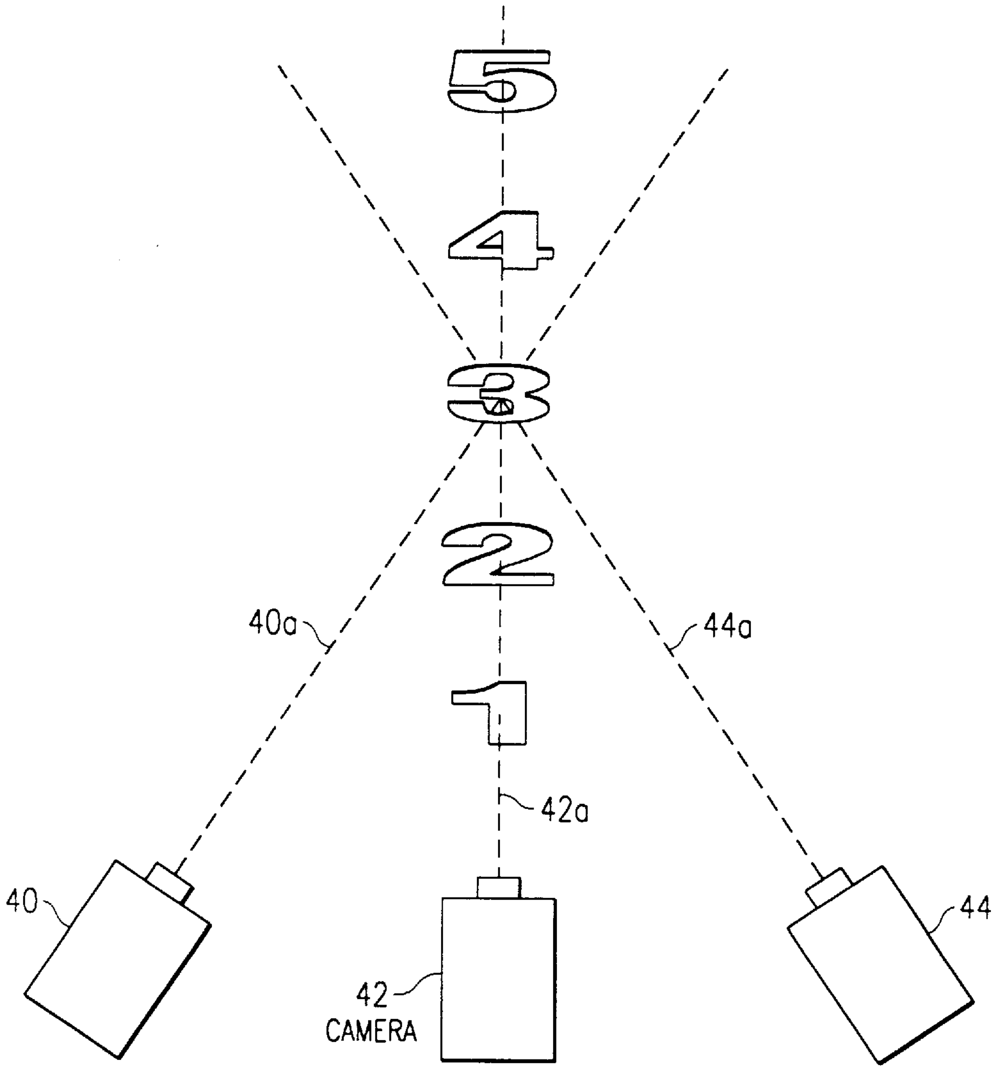
FIG. 4 illustrates the method of layering images to achieve a three-dimensional shifting effect.
Figure 5A:
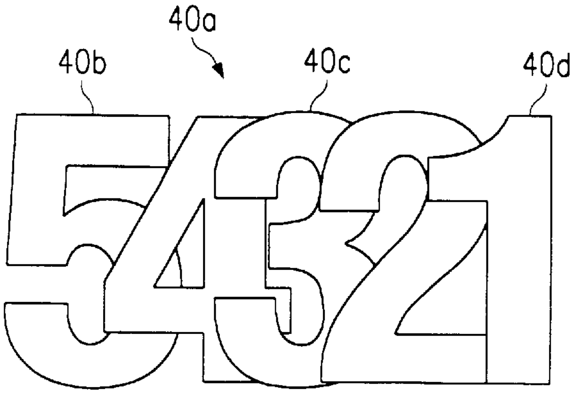
FIGS. 5*a*, 5*b*, and 5*c* illustrate the shifting effect created by the layering method of FIG. 4.
Figure 5B:
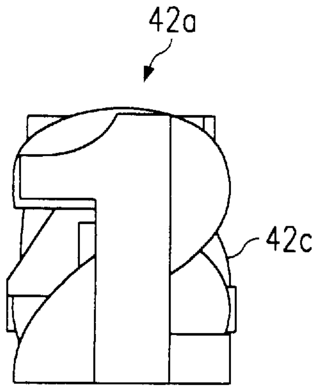
Figure 5C:
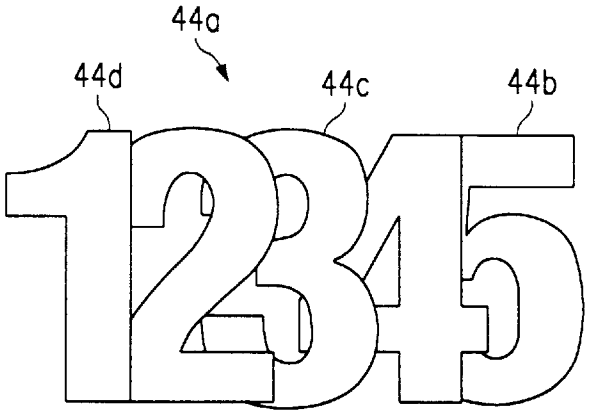
Figure 6:
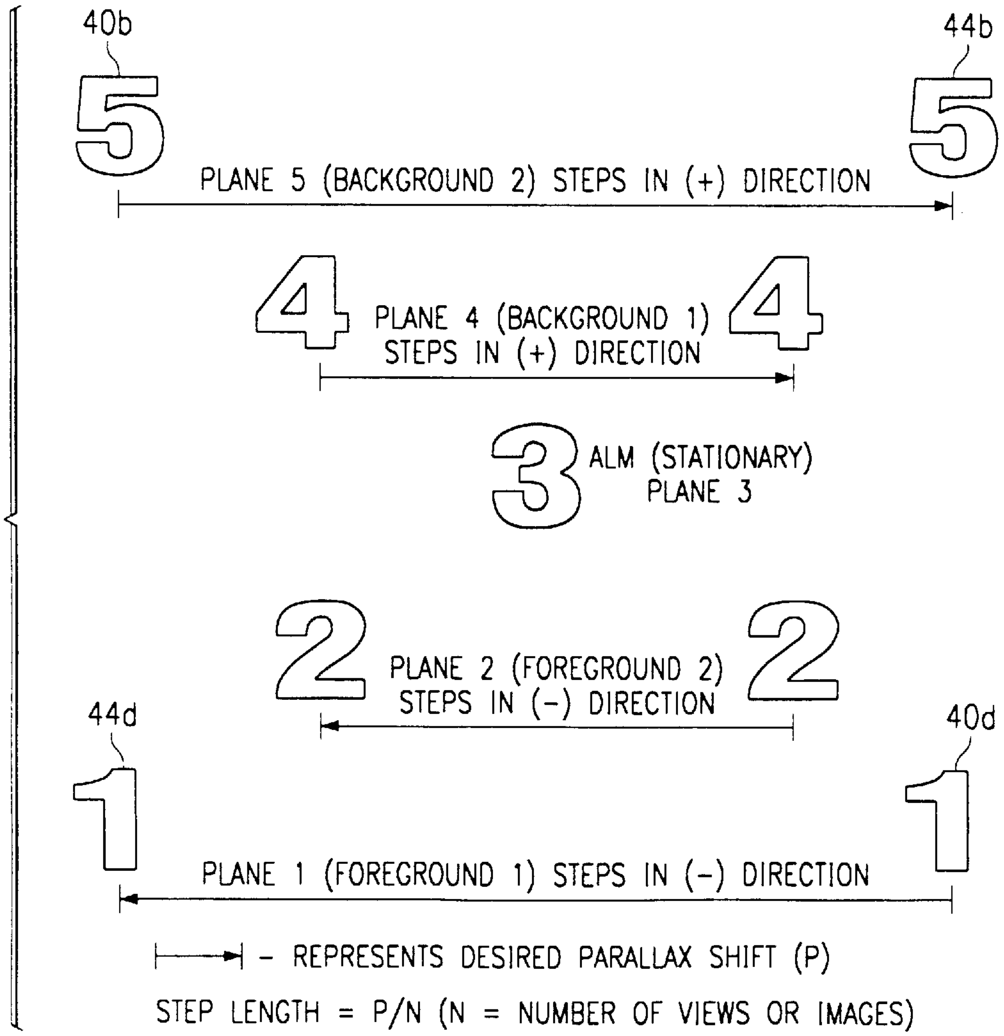
FIG. 6 illustrates the parallax shift of the images recorded in FIG. 4.

The depth of a three dimensional interlaced image can be improved with a stacking effect as illustrated in FIGS. 4, 5, and 6. In FIG. 4, three cameras (40), (42), and (44) take a picture of an image comprising five layers. It will be understood to the artisan of ordinary skill that one camera at three different positions can be used in place of three cameras at individual positions. The use of multiple cameras can be preferred when attempting to capture stop motion three dimensional image sequences. The cameras (40, 42, 44) take pictures from different perspectives. In each case, the camera centers the image in the third layer. The resulting source images generated by the cameras are then interlaced as described above. For the purposes of this example, the center image is maintained in the center of each perspective source image. The pictures will be taken by the cameras along the indicated paths which will preferably be symmetrically disposed. FIGS. 5*a*, 5*b* and 5*c* illustrate the source images (40*a*, 42*a*, 44*a*) captured by each camera (40), (42), and (44), respectively.

The source images in the example of FIGS. 5*a*–5*c* are centered on the number 3 which is the center layer of the five layers depicted. The image could easily be any three dimensional object. The numbered layers simply illustrate the layered nature of any three dimensional object, where the closer layers overlay more distant layers. For example, the number five appears on the far left and behind all the other numbers 1–4 of the image (40*a*) from the camera (40). In contrast, the number 5 is on the far right of the image (44*a*) from the camera (44). When the source images are interlaced, there is a parallax shift between the images (40*b*)and (44*b*). The greater this parallax shift results in a greater sense of depth in the picture. The three dimensional lenticular images described above use these layered source images which are, in essence, sequential in space.

Figure 7A:
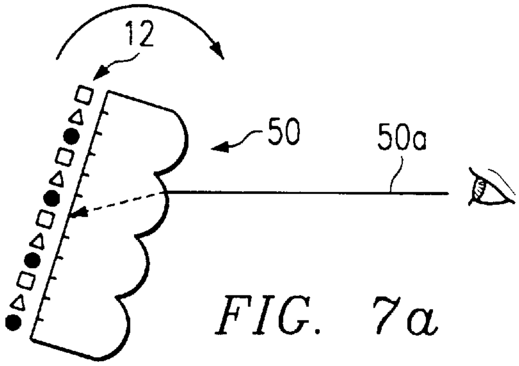
FIGS. 7*a*, 7*b*, 8*a*, 8*b*, 9*a* and 9*b* illustrates how different images are seen based upon the shifting of the viewer's perspective relative to the linear axis of the lenticules of the lenticular lens.
Figure 7B:
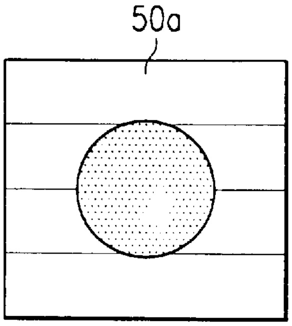
Figure 8A:
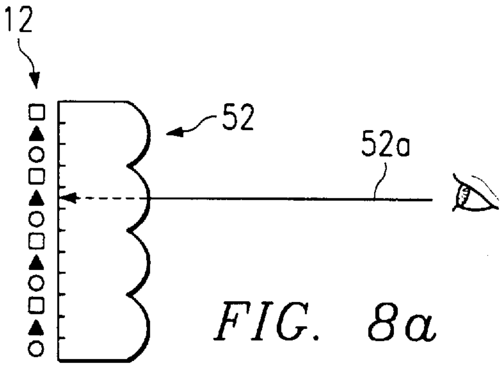
Figure 8B:
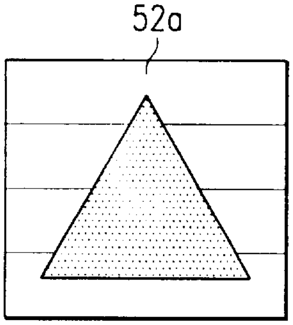
Figure 9A:
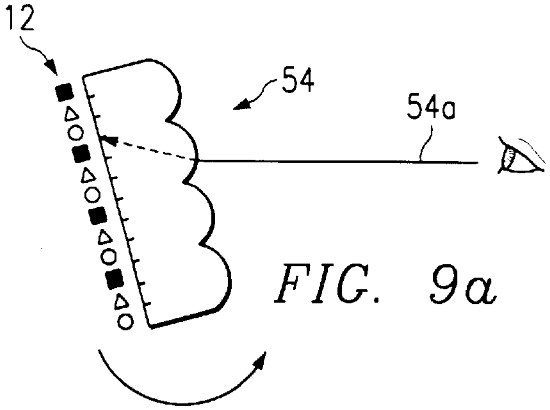
Figure 9B:
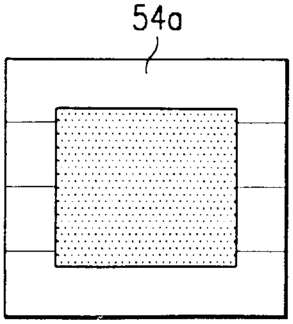

FIGS. 7, 8 and 9 further illustrate the effect that viewing angle has on the final lenticular image perceived by the viewer. When the lenticular image is viewed from a first perspective (50), such as shown in FIG. 7*a*, the viewer will only see the circle (50*a*) which is formed from image strips of the circle that are interspersed in the interlaced image (12). Likewise, when the image is viewed from a second perspective (52), the viewer will only see the lenticular image (52*a*) which corresponds to image strips of the triangle image that is interspersed in the interlaced image (12) on the back surface of the lenticular image. Finally, only the square image (54*a*) is visible to a viewer standing at a third perspective (54).

In addition to designing the lenticular geometry to accommodate a particular viewing distance, the interlaced image can also provide for adjusting the viewing distance. For example, if the frequency of combined image strips of the interlaced image and the lenticular frequency of the lenticular lens are equal, the viewing distance will be considered to be infinite. Increasing the width of the combined image strips will cause the viewing distance to move closer to the surface of the lens. Generally, if the combined image strip width is less than the width of a single lenticule, a proper lenticular image will not form at any viewing distance without also forming or including a banding effect in that image.

The lenticular image perceived by a viewer is affected by the distance between the lenticular image and the viewer. For example, if the lenticular image were placed on the ordering menu behind the counter at a fast food restaurant, the relevant viewing distance would be the distance between the counter and the menu. In this instance, a lenticular lens could be designed that allows for full viewing of its lenticular image by a viewer standing at the counter, where the full view falls within the lobe angle of the lenticular image. In general, the farther the distance between a viewer and the lenticular image, the narrower the lobe angle should be. However, when a viewer will be able to view the entire span of the lenticular image, then the lobe angle can be made to approximate the maximum viewing angle. Thus, in certain applications, an optimal lenticular geometry can be developed if the viewing distance is known.

Figure 10:
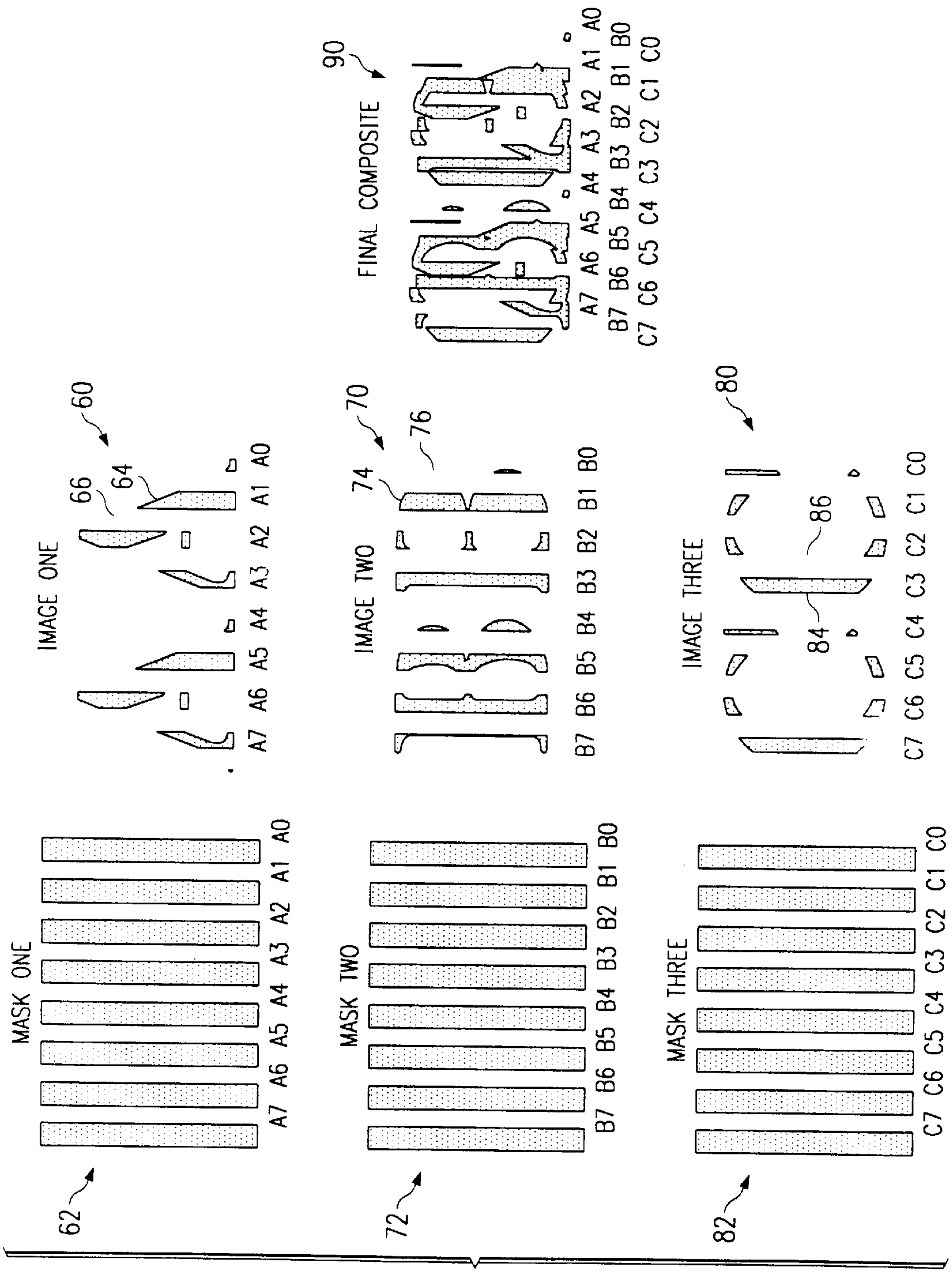
FIG. 10 illustrates a method of interlacing three images without offsetting the mask used to create the strip information from the original images.

The order and manner in which the interlacing of the source images is done can impact the quality of the lenticular image. A first method of interlacing the source images is depicted in FIG. 10. Three source images (60), (70), (80) are to be interlaced into a final interlaced image (90) over which a lenticular lens will be placed. The first image (60) is masked by a mask (62) that has both clear and opaque striping. The mask is intended to cover two thirds of the image, while one third will be saved for interlacing since each image will comprise a third of the final interlaced image. Thus, only a portion (64), which comprise plural image strips, of the underlying source image (60) remains in the interlaced image. The plural image strips (64) from the source image (62) is referenced individually in FIG. 10 as image strips ($A_0$–$A_7$). Likewise, the second (70) and third (80) images is masked with the second (72) and third (82) masks leaving portions (74, 84, respectively) which are also referenced in FIG. 10 as image strips ($B_0$–$B_7$, $C_0$–$C_7$, respectively). The remaining image information (76, 86) is discarded. The individual image strips are then interlaced into a final composite interlaced image (90). As depicted in FIG. 10, the image strips are laid down from right to left with the image strips ($A_0$, $B_0$, and $C_0$) being combined to form the rightmost combined image strip in the final composite interlaced image (90). The second combined image strip adjacent the first combined image strip includes individual image strips ($A_1$, $B_1$, and $C_1$). The remaining individual image strips ($A_2$–$A_7$, $B_2$–$B_7$ and $C_2$–$C_7$) are then interlaced in a similar manner to form their respective combined image strips which together form the final interlaced image (90). The final image is preferably composed from right to left if the parallax shift of the foreground layers of the source images (40*d*, 44*d*, shown in FIG. 6) shift from right to left. Experience has shown that failure to orient the mode of interlacing in the same direction of the foreground parallax shift results in a "pseudo" image. In other words, after the lenticular lens is placed over a reverse oriented composite interlaced image, the background will appear in the foreground of the three dimensional lenticular image. However, this reverse orientation of the foreground parallax shift to the order or mode of interlacing the individual strips may be desired in some instances. It should be noted that the masking and interlacing process are preferably done electronically either by a computer operator, a software program, a software plug-in, a software macro, a subroutine for a program or a batch process.

Figure 11:
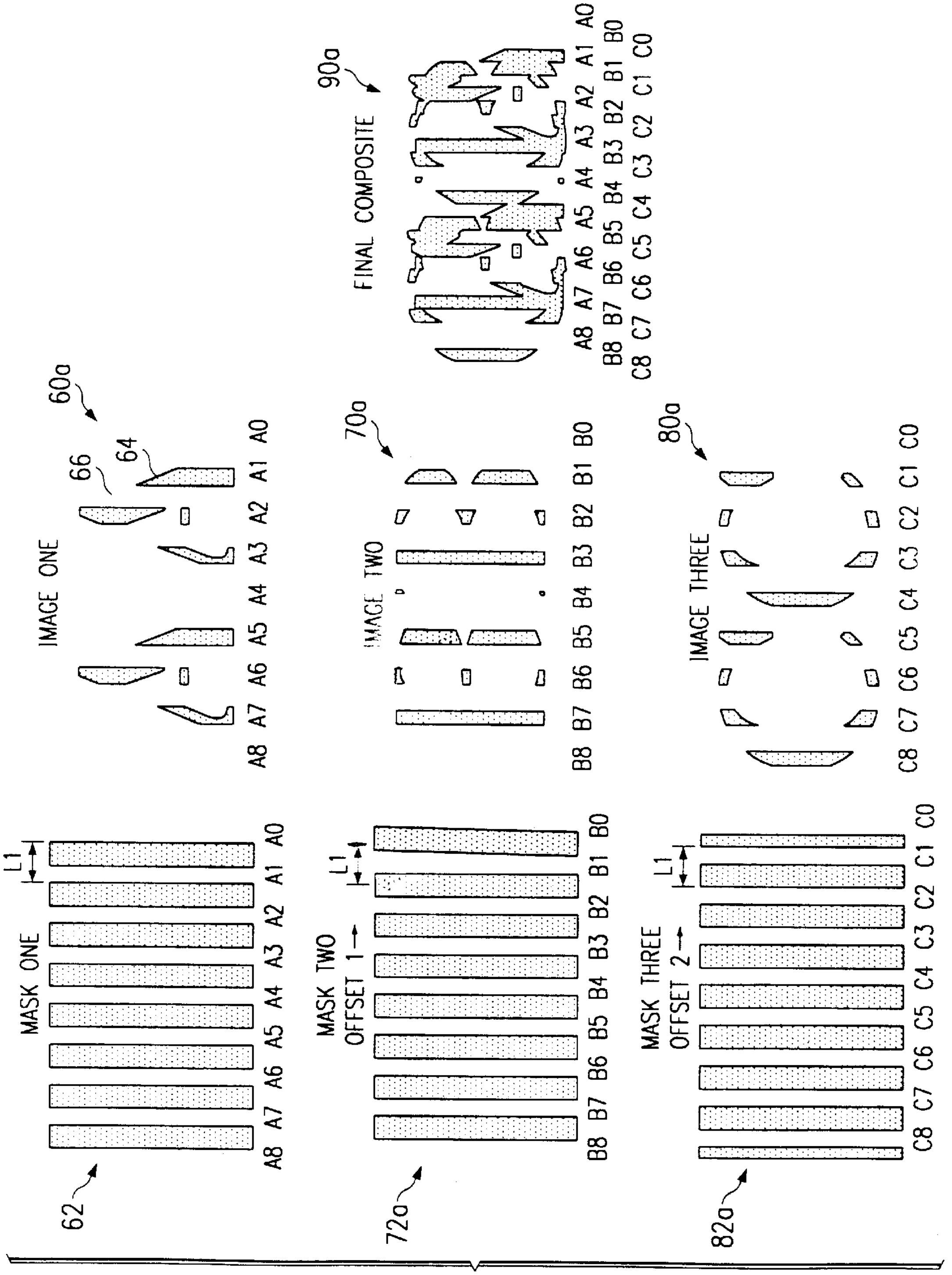
FIG. 11 illustrates a method of interlacing three images while offsetting the mask used to create the strip information from the original images.

Another embodiment of the process involves offsetting the mask used to prepare the individual image strips from the source images. Because of the cylindrical nature of the lenticules of the lenticular lens, the presence of steep curves in the source image or of lines which are aligned with the linear axis of the lenticules will result in a lenticular image having stepped images rather than smooth more contoured images. Better lenticular image quality can be achieved by repeatedly offsetting the mask used to prepare the individual image strips from the source images. For example, the mask (62) depicted in FIG. 11 has a first mask stripe width (L1) which corresponds to the width of a lenticule and which has its leftmost third open. The mask (72*a*) is then offset toward the left or right, but shown here as offset to the right, so that the middle third of the lenticular width (L1) is clear. In a similar fashion the mask (82*a*) is offset such that the right most third is clear. When the three images (62, 72*a*, 82*a*) are interlaced they form a second interlaced image (90*a*) which is different than the first interlaced image (90).

As alluded to above, the alignment of the lenticular lens relative to the interlaced image will impact the quality of the lenticular image perceived by a viewer. A misalignment between the two will cause a blurred and confused lenticular image. The axis of the lenticules is parallel to the axis of the image strips comprising the interlaced image. To complicate the matter, not all lenticular lenses are made to exact specifications or with uniform dimensions throughout their length. In other words, a first lenticular lens might be described as having 66 lpi when in fact is has 66.2 lpi. However, if the interlaced image has been sized electronically for a 66 lpi lens, then the corresponding lenticular image will be blurred with the blurring increasing from one end of the lens to the other of the lens in a direction transverse to the linear axes of the lenticules. The blurring will be a cumulative error.

The method for controlling the quality of a lenticular image can be applied toward determining the quality of a lenticular lens. In one embodiment, the invention provides a method for rapidly determining the quality of a lenticular lens which will have either an interlaced image printed on a rear surface of the lens or which will be attached to a substrate bearing an interlaced image. Generally the method comprises the step of obtaining a lenticular lens having an intended lenticular frequency, i.e., an intended frequency of lenticules, which lens is required to meet a first specification, such as a specific or exact lenticular frequency, or a first set of specifications. An interlaced image which comprises at least a first source image and a second source image, which has a known frequency of combined image strips is also obtained. Then the interlaced image is viewed through the lenticular lens being assayed to determine whether or not a desired lenticular image is formed. When the lenticular lens has a lenticular frequency that matches the frequency of combined image strips in the interlaced image, a desired lenticular image will be formed, and the lens will be deemed to be of acceptable quality. In a preferred embodiment, the interlaced image will comprise two source images, wherein the first source image consists essentially of a first color, and a second source image consists essentially of a second color. In a more preferred embodiment, the first color will be dark and the second color will be light. For example, the first color can be black, brown, purple, blue, green, maroon, or red, and the second color can be yellow, white, pink, tan, ivory or salmon.

If desired, the method for determining the quality of a lenticular lens can also be used to determine the lenticular frequency of the lens. For example, a lenticular lens having an unknown or intended lenticular frequency will be used to view at least two interlaced images having different combined image strip frequencies. The lenticular lens will then form a lenticular image of acceptable quality as determined by an operator or an instrument with at least one of the interlaced images. The lenticular frequency of the lenticular lens approximates the combined image strip frequency of an interlaced image when an acceptable lenticular image is formed. In a preferred embodiment, the lenticular frequency of the lenticular lens will be slightly higher than the frequency of combined image strips in an interlaced image which, together with the lenticular lens, forms a lenticular image of acceptable quality. In even more preferred embodiments, the lenticular frequency and the frequency of combined image strips will differ by less than ten percent, even more preferably less than five percent, and still more preferably less than two percent of either frequency.

The method of rapidly determining the quality of a lenticular lens can be conducted either visually by an operator or electronically by an instrument, apparatus or machine. The method of the invention can also be conducted during or after the manufacture of a lenticular lens, therefore, it can be used as a quality assurance/quality control (QA/QC) method. In a preferred embodiment, the method of the invention will be conducted prior to either printing an interlaced image on the rear surface of the lenticular lens or prior to attaching to the rear surface of the lens a substrate bearing an interlaced image. Such an improvement in the method will provide for reduced material loss and may permit for recycling of the material used to make the lenticular lens. For example, if a lenticular lens is determined to be of unacceptable quality, then the lenticular lens can be recycled with appropriate processing so that the material comprising the lens, which in a preferred embodiment is polymeric, can be reprocessed to form a new lenticular lens.

Although preferred embodiments of the present invention have been described in the foregoing Detailed Description and illustrated in the accompanying drawings, it will be understood that the invention is not limited to the embodiments disclosed, but is capable of numerous rearrangements, modifications, and substitutions of steps without departing from the spirit of the invention. Accordingly, the present invention is intended to encompass such rearrangements, modifications, and substitutions of steps as fall within the scope of the appended claims.

What is claimed is:

1. A method of producing a lenticular image comprising, in the order indicated, the steps of:

a. interlacing at least first and second source images with a computer to form an interlaced image;

b. dithering on said computer said interlaced image to form a dithered interlaced image having a first resolution; and c. printing said interlaced image on a bottom surface of a lenticular lens having a lenticular frequency.

2. The method of claim 1, wherein step (a) is conducted by:

creating an interlaced image with at least first and second source images wherein said interlaced image includes a plurality of combined image strips each comprising alternating individual image strips of said at least first and second source images.

3. The method of claim 2 further comprising the step of:

(b') sizing said interlaced image, that has been dithered, prior to step (c) such that a frequency of combined image strips in said interlaced image matches said lenticular frequency.

4. A lenticular image made according to the method of claim 3.

5. The method of claim 2, wherein said interlaced image has a frequency of combined image strips that is less than and within 10% of said lenticular frequency.

6. The method of claim 2, wherein said interlaced image comprises at least three dithered source images.

7. A method of claim 2, wherein said interlaced image has a frequency of said combined image strips which matches said lenticular frequency.

8. A lenticular image made according to the method of claim 7.

9. The method of claim 1, further comprising the step of:

(d) applying a substrate under said interlaced image.

10. The method of claim 9, wherein said substrate is at least opaque.

11. The method of claim 1, wherein said at least first and second source images are at least one of sequential in time and sequential in space.

12. The method of claim 1, wherein said first resolution substantially matches a second resolution of an output device which will be used to print said interlaced image.

13. A lenticular image made according to the method of claim 12.

14. The method of claim 1, wherein said at least first and second source images are converted to at least first and second converted source images prior to being interlaced.

15. The method of claim 14 wherein the step of converting the first and second source images includes converting the resolution of the first and second source images.

16. The method of claim 14 wherein the step of converting the first and second source images includes converting the dimensions of the first and second source images.

17. A lenticular image made according to the method of claim 1.

18. A method of producing a lenticular image comprising the steps of:

(a) interlacing at least first and second source images on a computer to form an interlaced image having a first resolution and a first frequency of combined image strips;

(b) matching said first resolution of said interlaced image to a resolution of an output device by dithering said interlaced image on said computer;

c) adjusting the size of said interlaced image to form a sized interlaced image having a frequency of combined image strips that is within 10% of a frequency of lenticules in a lenticular lens; and (d) outputting said sized interlaced image to form an output interlaced image.

19. The method of claim 18, wherein said sized interlaced image is output to at least one of a rear surface of said lenticular lens, a substrate, a computer monitor, a display, and a television.

20. The method of claim 18 wherein said combined image strips each comprise alternating individual image strips of said at least first and second source images.

21. The method of claim 18, wherein at least one of said at least first and second source images is dithered prior to interlacing.

22. The method of claim 18, wherein at least one of said frequency of combined image strips:

1. matches said frequency of lenticules; and
2. is less than and within 10% of said frequency of lenticules.

23. A lenticular device comprising:

a lenticular lens having a first frequency of lenticules; and a dithered interlaced image comprising at least first and second source images;

wherein, said interlaced image has been dithered after said at least first and second source images have been interlaced; and said interlaced image has a second frequency of combined image strips, said combined image strips comprising alternating individual image strips of said at least first and second source images.

24. The lenticular device of claim 23, wherein said dithered interlaced image has been printed on at least one of a surface of said lenticular lens, and a substrate.

25. The lenticular device of claim 23, wherein said dithered interlaced image forms one or more of a three dimensional and an action lenticular image when said dithered interlaced image is viewed through said lenticular lens.

26. The lenticular device of claim 23, wherein said dithered interlaced image has a resolution which matches the resolution of an output device used to output said dithered interlaced image.

27. The lenticular device of claim 23, wherein one of said first frequency of lenticules:

(1) matches said second frequency of combined image strips;

(2) is less than and within 10% of said frequency of lenticules; and (3) is within 10% of said frequency of lenticules.

28. The lenticular device of claim 23, wherein said lenticular lens has a lenticule pitch which is less than a combined image strip pitch of said dithered interlaced image.

29. The lenticular device of claim 23, wherein one or more of said at least first and second source images has been dithered prior to being interlaced.

30. A method of quality control for the manufacture of lenticular devices comprising the steps of:

generating a sized interlaced image, comprising plural combined image strips, bounded on a first side by a sized first mask and bounded on an opposing second side by an unsized second mask, wherein said sized first mask has a first strip frequency which matches a combined image strip frequency of said sized interlaced image, said unsized second mask has a second strip frequency different than said first strip frequency, and said first and second masks are disposed along opposing ends of said combined image strips; and viewing said sized interlaced image through a lenticular lens having a frequency of lenticules to determine whether said frequency of lenticules matches said first strip frequency or said second strip frequency;

whereby a lenticular lens device is of acceptable quality when said frequency of lenticules matches said first strip frequency.

31. The method of quality control of claim 30, wherein said method is used in assembling said sized interlaced image with said lenticular lens.

32. A method for rapidly determining the quality of a lenticular lens, the method comprising the steps of:

obtaining a lenticular lens comprising a plurality of lenticules and having a lenticular frequency and a first geometry, said lens being required to meet a first set of specifications;

obtaining one or more interlaced images having a known combined-image strip frequency, each interlaced image comprising at least a first source image and a second source image; and viewing said one or more interlaced images through said lenticular lens to determine whether a desired lenticular image is formed, wherein a lenticular lens is of acceptable quality when a desired lenticular image is formed.

33. The method of claim 32, wherein a desired lenticular image is formed when said lenticular frequency matches said combined-image strip frequency.

34. The method of claim 32, wherein said first source image consists essentially of a first color and said second source image consists essentially of a different second color.

35. The method of claim 34, wherein said first color is a dark color and said second color is a light color.

36. The method of claim 34, wherein said desired lenticular image consists essentially of one of said first source image and said second source image.

37. The method of claim 32, wherein at least two interlaced images having different and known combined image strip frequencies are used.

38. The method of claim 37, wherein said lenticular frequency of said lenticular lens is determined by determining which of said at least two interlaced images forms a desired lenticular image with said lenticular lens.

39. The method of claim 32, wherein said viewing step is conducted by at least one of a visual method and an electronic method.

40. The method of claim 32, wherein said method is conducted while said lenticular method is being manufactured.

41. The method of claim 32, wherein said method is conducted prior to one of:

(a) printing an interlaced image on a rear surface of said lenticular lens; and (b) attaching to a rear surface of said lenticular lens a substrate bearing an interlaced image.

* * * * *